(12) United States Patent
Qiu et al.

(10) Patent No.: US 11,475,614 B2
(45) Date of Patent: Oct. 18, 2022

(54) IMAGE PROCESSING APPARATUS AND NON-TRANSITORY COMPUTER READABLE MEDIUM FOR CALCULATING A POSITION AT WHICH TO SUPERIMPOSE A DESIGN OBJECT ONTO AN IMAGE

(71) Applicant: FUJIFILM BUSINESS INNOVATION CORP., Tokyo (JP)

(72) Inventors: Qianru Qiu, Kanagawa (JP); Makoto Sasaki, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 172 days.

(21) Appl. No.: 16/999,220

(22) Filed: Aug. 21, 2020

(65) Prior Publication Data
US 2021/0295092 A1   Sep. 23, 2021

(30) Foreign Application Priority Data
Mar. 17, 2020   (JP) .............................. JP2020-046569

(51) Int. Cl.
| G06T 11/60 | (2006.01) |
| G06K 9/62 | (2022.01) |
| G06T 7/90 | (2017.01) |
| G06T 7/194 | (2017.01) |

(52) U.S. Cl.
CPC ............ *G06T 11/60* (2013.01); *G06K 9/6223* (2013.01); *G06K 9/6272* (2013.01); *G06T 7/194* (2017.01); *G06T 7/90* (2017.01)

(58) Field of Classification Search
CPC ........... G06T 11/60; G06T 7/194; G06T 7/90; G06K 9/6223; G06K 9/6272
See application file for complete search history.

(56) References Cited

U.S. PATENT DOCUMENTS

| 8,271,871 B2 | 9/2012 | Marchesotti |
| 9,025,872 B2 | 5/2015 | Yabu |
| 9,767,077 B2 | 9/2017 | Kinkoh |
| 2020/0410686 A1* | 12/2020 | Zhang .................... G06T 11/60 |

FOREIGN PATENT DOCUMENTS

| JP | 5302258 B2 | 10/2013 |
| JP | 6023058 B2 | 11/2016 |
| JP | 6422228 B2 | 11/2018 |

* cited by examiner

Primary Examiner — Casey L Kretzer
(74) Attorney, Agent, or Firm — Oliff PLC

(57) ABSTRACT

An image processing apparatus includes a processor configured to receive an image having a foreground segment and a background segment, receive a design object, calculate a position for superimposing the design object, on a basis of respective features of the foreground segment, the background segment, and the design object, and perform output to superimpose the design object at the calculated position.

16 Claims, 18 Drawing Sheets

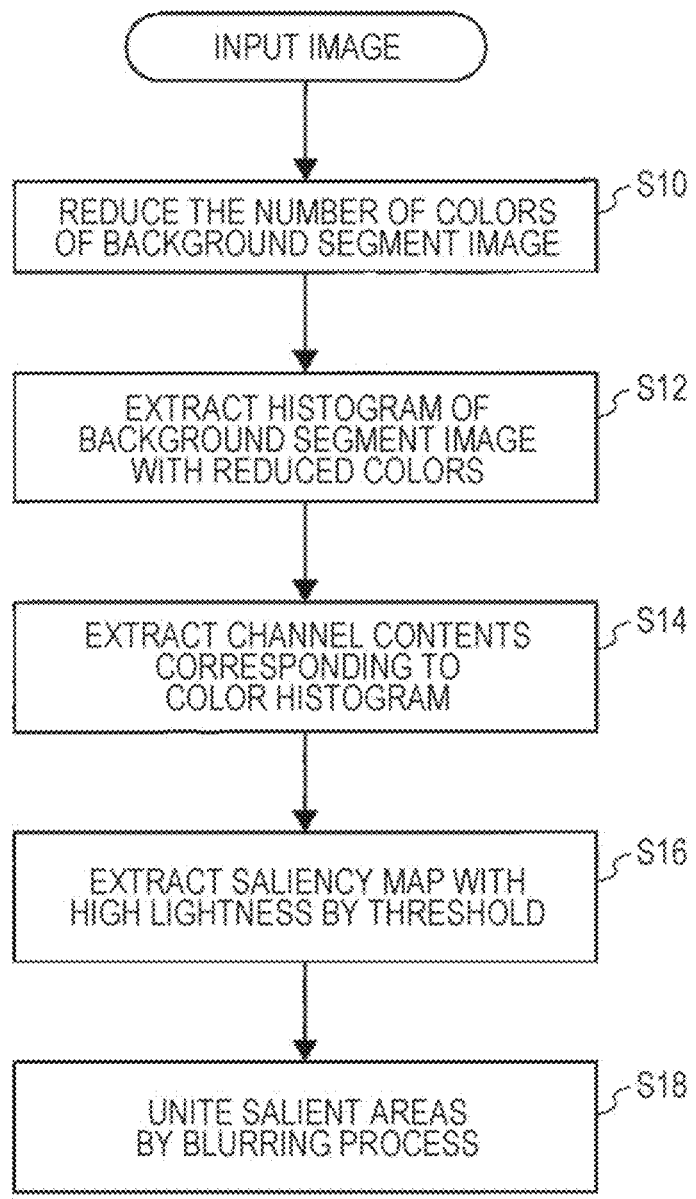

FIG. 5

| IMAGE ID | IMAGE NAME | IMPORTANCE COEFFICIENT $\alpha$ |
|---|---|---|
| 1 | TEXT | 1.0 |
| 2 | LOGO | 0.4 |
| 3 | PERSON | 0.1 |
| 4 | ANIMAL | 0.1 |
| 5 | BUILDING | 0.05 | step = stepX + stepY

IMAGE PROCESSING APPARATUS AND NON-TRANSITORY COMPUTER READABLE MEDIUM FOR CALCULATING A POSITION AT WHICH TO SUPERIMPOSE A DESIGN OBJECT ONTO AN IMAGE

CROSS-REFERENCE TO RELATED APPLICATIONS

This application is based on and claims priority under 35 USC 119 from Japanese Patent Application No. 2020-046569 filed Mar. 17, 2020.

BACKGROUND

(i) Technical Field

The present disclosure relates to an image processing apparatus and a non-transitory computer readable medium.

(ii) Related Art

Japanese Patent No. 5302258 discloses a method for positioning objects in an electronic document. The method includes identifying a first object and a second object to be positioned in a page in an input electronic document, detecting saliency for the first object, including generating a saliency map of the first object, generating a first one-dimensional guideline profile for the first object by detecting the saliency for the first object, the first one-dimensional guideline profile being based on one-dimensional averaging of the saliency in the saliency map, generating a second one-dimensional guideline profile for the second object by detecting saliency for the second object, positioning the first object and the second object on the basis of the first and second guideline profiles and generating a corrected document, and outputting the corrected document.

Japanese Patent No. 6023058 discloses an image processing apparatus including a division unit, a calculation unit, and a classification unit. The division unit performs division of each of multiple images into multiple segments. The calculation unit calculates importance of each of the segments resulting from the division of one of the multiple images on the basis of a relation between the segment and a different one of the segments in the one image or a relation between the segment and a segment resulting from the division of a predetermined different image. The classification unit classifies each segment resulting from the division as one of types that are an object segment, a foreground segment, and a background segment. The calculation unit calculates the importance of the segment by using at least one of a degree of attention of the segment, a degree of co-occurrence of the segment, and object importance. The calculation unit calculates the degree of attention of the segment such that the shorter a distance between a position of the segment and an attention position estimated to have attracted a photographer's attention in the one image, the higher the degree of attention. The calculation unit calculates the importance of the foreground segment and the background segment on the basis of the calculated degree of attention. The calculation unit obtains the centroid of the object segment of the one image, and obtains the attention position in the one image such that the centroid and the attention position have point symmetry with respect to the center point in the one image.

Japanese Patent No. 6422228 discloses a non-transitory computer-readable storage medium storing a program that causes a computer to execute a process for displaying a page having an object on a display. The process includes: displaying an input screen for inputting a text in accordance with an instruction given by a user for a display item displayed outside the page on the display and receiving, as an object to be newly superimposed on the page, a text object representing the text input on the input screen; and displaying the page on which the text object received in the receiving is superimposed. Multiple objects may be superimposed and displayed. In a case where when a first text object is received in the receiving, a second text object has been superimposed at a predetermined position in the page, the page in which the first text object is superimposed at a position where the first text object does not overlap the second text object is displayed in the displaying. The first text object is superimposed on the basis of the position where the second text object is superimposed.

SUMMARY

In some cases, there is a need for superimposing a design object on a background segment of an image having a foreground segment and the background segment.

Aspects of non-limiting embodiments of the present disclosure relate to providing an image processing apparatus and a non-transitory computer readable medium that are enabled to superimpose a design object to keep balance in design when the design object is superimposed on a background segment of an image having a foreground segment and the background segment.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an image processing apparatus including a processor configured to receive an image having a foreground segment and a background segment, receive a design object, calculate a position for superimposing the design object, on a basis of respective features of the foreground segment, the background segment, and the design object, and perform output to superimpose the design object at the calculated position.

BRIEF DESCRIPTION OF THE DRAWINGS

An exemplary embodiment of the present disclosure will be described in detail based on the following figures, wherein:

FIG. 3 is a flowchart illustrating the flow of processing for forming a saliency map in the image processing apparatus according to the exemplary embodiment of the present disclosure;

FIG. 5 is a table illustrating importance coefficients of the respective types of images in the image processing apparatus according to the exemplary embodiment of the present disclosure;

DETAILED DESCRIPTION

An exemplary embodiment of the present disclosure will be described in detail with reference to the drawings.

Figure 1:
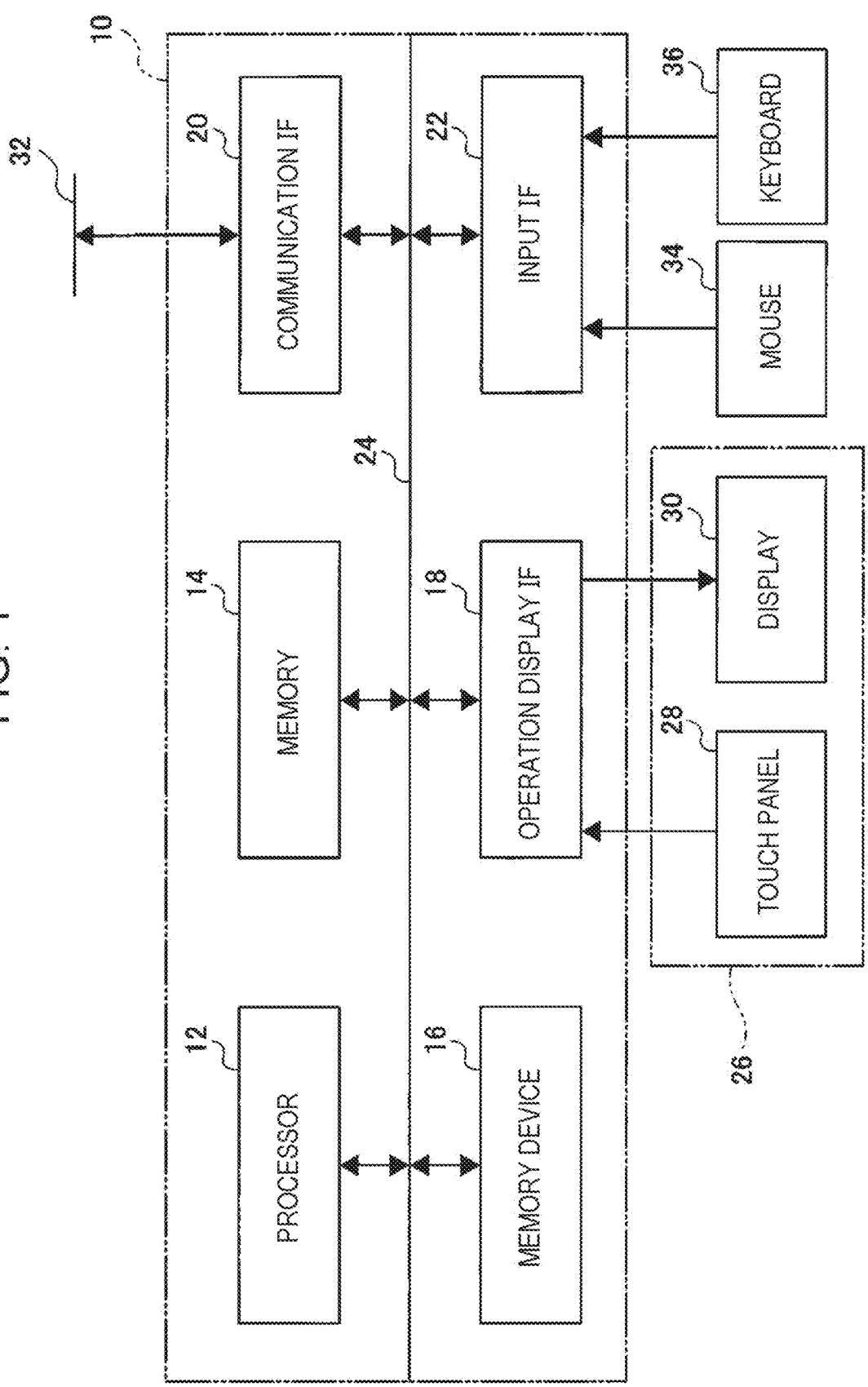
FIG. 1 is a block diagram illustrating the hardware of an image processing apparatus according to the exemplary embodiment of the present disclosure.

FIG. 1 illustrates the hardware configuration of an image processing apparatus 10 according to the exemplary embodiment of the present disclosure.

The image processing apparatus 10 includes a processor 12, a memory 14, a memory device 16, an operation display interface 18, a communication interface 20, and an input interface 22. The processor 12, the memory 14, the memory device 16, the operation display interface 18, the communication interface 20, and the input interface 22 are connected via a bus 24.

The processor 12 performs predetermined processing in accordance with a control program stored in the memory 14. The memory device 16 is composed of, for example, a hard disk and stores required software and data. An operation display 26 is connected to the operation display interface 18. The operation display 26 is provided with a touch panel 28 and a display 30 and is designed to receive operation data from the touch panel 28 and transmit display data to the display 30.

The communication interface 20 is connected to a terminal apparatus and a server via a local area network (LAN) 32, receives an image from the terminal apparatus or the server, and transmits an image to the terminal apparatus or the server. The communication interface 20 may be connected to the terminal apparatus and the server via not only a LAN but also the Internet.

A mouse 34 and a keyboard 36 are connected to the input interface 22. Operation signals and operation data from the mouse 34 and the keyboard 36 are input into the input interface 22.

Figure 2:
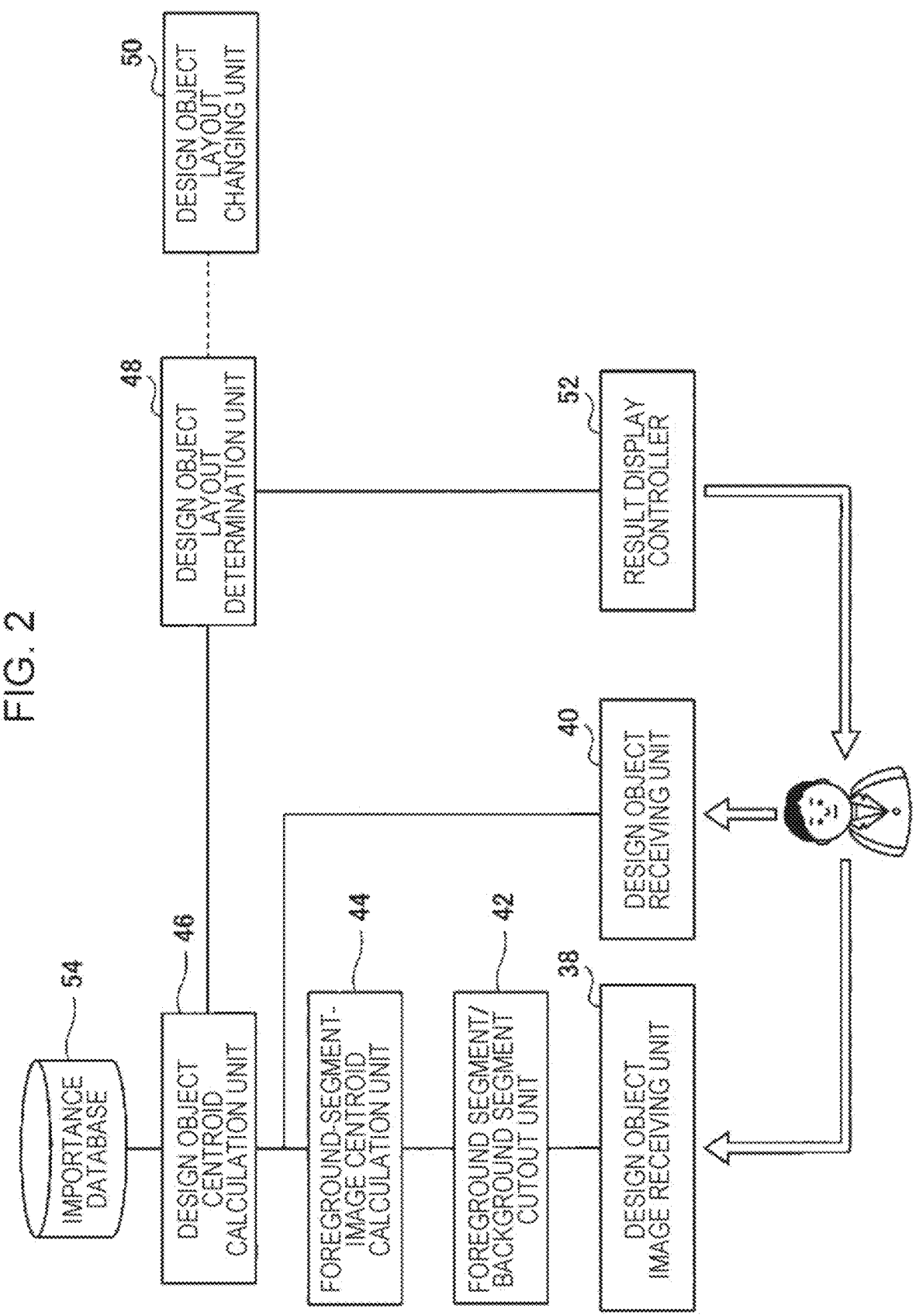
FIG. 2 is a block diagram illustrating the software configuration of the image processing apparatus according to the exemplary embodiment of the present disclosure.

FIG. 2 illustrates the software configuration for implementing the functions of the image processing apparatus 10.

The image processing apparatus 10 includes a design object image receiving unit 38 and a design object receiving unit 40.

The design object image receiving unit 38 receives an image having a foreground segment and a background segment. The design object receiving unit 40 receives an image to be superimposed. The design object image receiving unit 38 receives an image stored in the memory device 16 described above, an image transmitted from the terminal apparatus or the server via the communication interface 20, and other images. In addition to the image stored in the memory device 16 and the image transmitted from the terminal apparatus or the server via the communication interface 20, the design object receiving unit 40 likewise receives an image formed as a text. The received images include a text, a logo, an illustration, and an image.

As to be described later, a foreground segment/background segment cutout unit 42 cuts out the foreground segment and the background segment of the image received by the design object image receiving unit 38 on the basis of the saliency map of a background segment image.

As to be described later, a foreground-segment-image centroid calculation unit 44 calculates the centroid position of the foreground segment by using the moment on the basis of features such as a color difference between the foreground segment image and the background segment image, a color difference between the design object and the background segment image, and the visual importance regarding the type of the foreground segment.

As to be described later, a design object centroid calculation unit 46 calculates the centroid position of a design object layout space to place the centroid position at a position symmetrical to the centroid position of the foreground segment image with respect to the center of the image.

As to be described later, a design object layout determination unit 48 determines whether the design object to be superimposed at the position calculated by the design object centroid calculation unit 46 is superimposed within the background segment image. For example, the design object layout determination unit 48 determines whether the design object protrudes from a design object image or overlaps the foreground segment image.

As to be described later, when the design object layout determination unit 48 determines that the design object is not superimposed within the background segment image, a design object layout changing unit 50 changes the layout of the design object to superimpose the design object within the background segment image.

A result display controller 52 performs control to cause the above-described display to display a state where the design object is superimposed on the background segment image.

As to be described later, an importance database 54 is a database storing visual importance of each image set in advance on a per image type basis.

Forming the saliency map of the background segment image by the foreground segment/background segment cut-out unit 42 will be described.

Figure 4A:
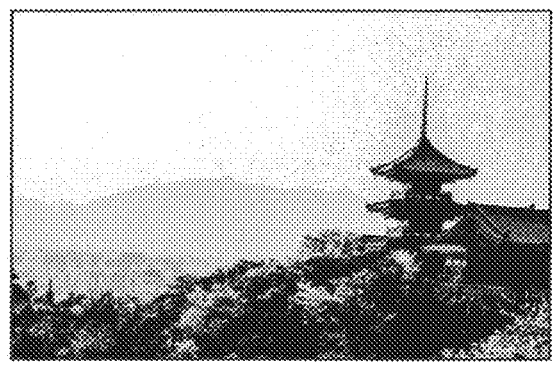
FIGS. 4A to 4D are views illustrating changes in an image used for forming the saliency map in the image processing apparatus according to the exemplary embodiment of the present disclosure.
Figure 4B:

FIG. 3 illustrates a flowchart for forming a saliency map, and FIGS. 4A to 4D illustrate changes of an image at the time of performing the steps in the flowchart. After a design object image (original image) illustrated in FIG. 4A is input, color subtraction is performed first in step S10 on the original image by Kmeans that is one of non-hierarchical cluster analyses. Kmeans is also called Kmeans clustering and is one of the non-hierarchical cluster analyses. The color in the original image is reduced by Kmeans, an image with reduced colors is generated as illustrated in FIG. 4B.

In subsequent step S12, a histogram representing the frequency of each of pixel values of the original image with the reduced colors is extracted. In subsequent step S14, what are represented by the respective pixel values of R, G, B channels in the histogram extracted in step S12 and pixel values called an alpha channel representing transparency are extracted.

Figure 4C:
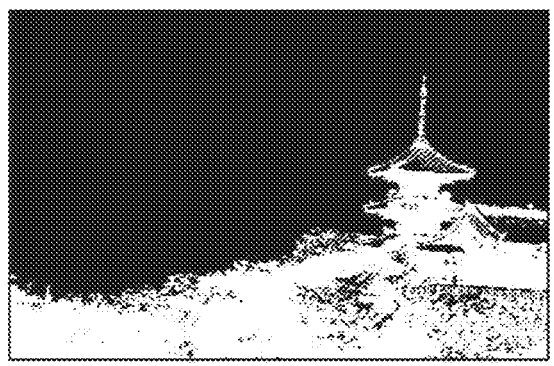
Figure 4D:
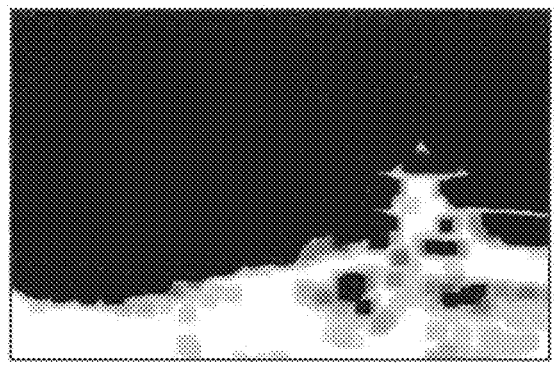

In subsequent step S16, what bright pixel values represent is extracted for a saliency map by using a predetermined threshold. After the saliency map is extracted, a foreground segment and a background segment may be separated from each other as illustrated in FIG. 4C. A blurring process is executed in step S18, the salient areas may be united as illustrated in FIG. 4D, and the foreground segment and the background segment may thereby be separated.

A method for calculating the centroid of a foreground segment image performed by the foreground-segment-image centroid calculation unit 44 will be described.

Formula (1) is a general expression for calculating the physical centroid position in the xy-Cartesian coordinate system.

$$\text{centroid} = \frac{\int xf(x,y)dx}{\int f(x,y)dx} = \frac{\text{first moment}}{\text{zero-th moment}} \quad (1)$$

The centroid position is obtained by dividing the first moment by the zero-th moment.

Adding elements that are a color difference and importance in obtaining the centroid position results in Formula (2).

$$f(x,y) = \alpha_{x,y} w(x,y) \quad (2)$$

Note that $w(x,y)$ is a color difference between the foreground segment and the background segment, and $\alpha_{x,y}$ is a coefficient representing importance set in advance in accordance with the type of the foreground segment image.

Formula (3) is used to calculate $w(x,y)$.

$$w(x,y) = \sqrt{(R_{x,y}-R_{bg})^2 + (G_{x,y}-G_{bg})^2 + (B_{x,y}-B_{bg})^2} \quad (3)$$

$R_{x,y}$, $G_{x,y}$, and $B_{x,y}$ are respectively RGB values of each of pixels of the foreground segment image in the RGB color space, $R_{bg}$, $G_{bg}$, and $B_{bg}$ are respectively RGB mean values of the background segment in the RGB color space (hereinafter, referred to as a main color).

Note that the color space is not limited to the RGB color space, and HSV and Lab color spaces may be used.

If the foreground segment image includes a logo or a text as a design object, calculation is performed in such a manner as in Formula (4).

$$\text{center}_{img} = \frac{x_{img}\alpha_{img}w_{img} + x_{text}\alpha_{text}w_{text} + x_{logo}\alpha_{logo}w_{logo}}{\alpha_{img}w_{img} + \alpha_{text}w_{text} + \alpha_{logo}w_{logo}} \quad (4)$$

Note that $\text{center}_{img}$ is the center of the original image; $\alpha_{img}$, the importance of a foreground segment image; $\alpha_{text}$, the importance of the text; $\alpha_{logo}$, the importance of the logo; $w_{img}$, a color difference of an image; $w_{text}$, a color difference of the text; and $w_{logo}$, a color difference of the logo.

FIG. 5 illustrates importance for each type of images stored in the importance database 54. The results are obtained from existing works by professional designers. For example, texts easily attract attention and thus have a value of 1.0. Persons attract more attention than buildings. Accordingly, buildings have a value of 0.05, while the persons have a value of 0.1.

The flow of operations performed by the processor 12 described above will be described.

Figure 6:
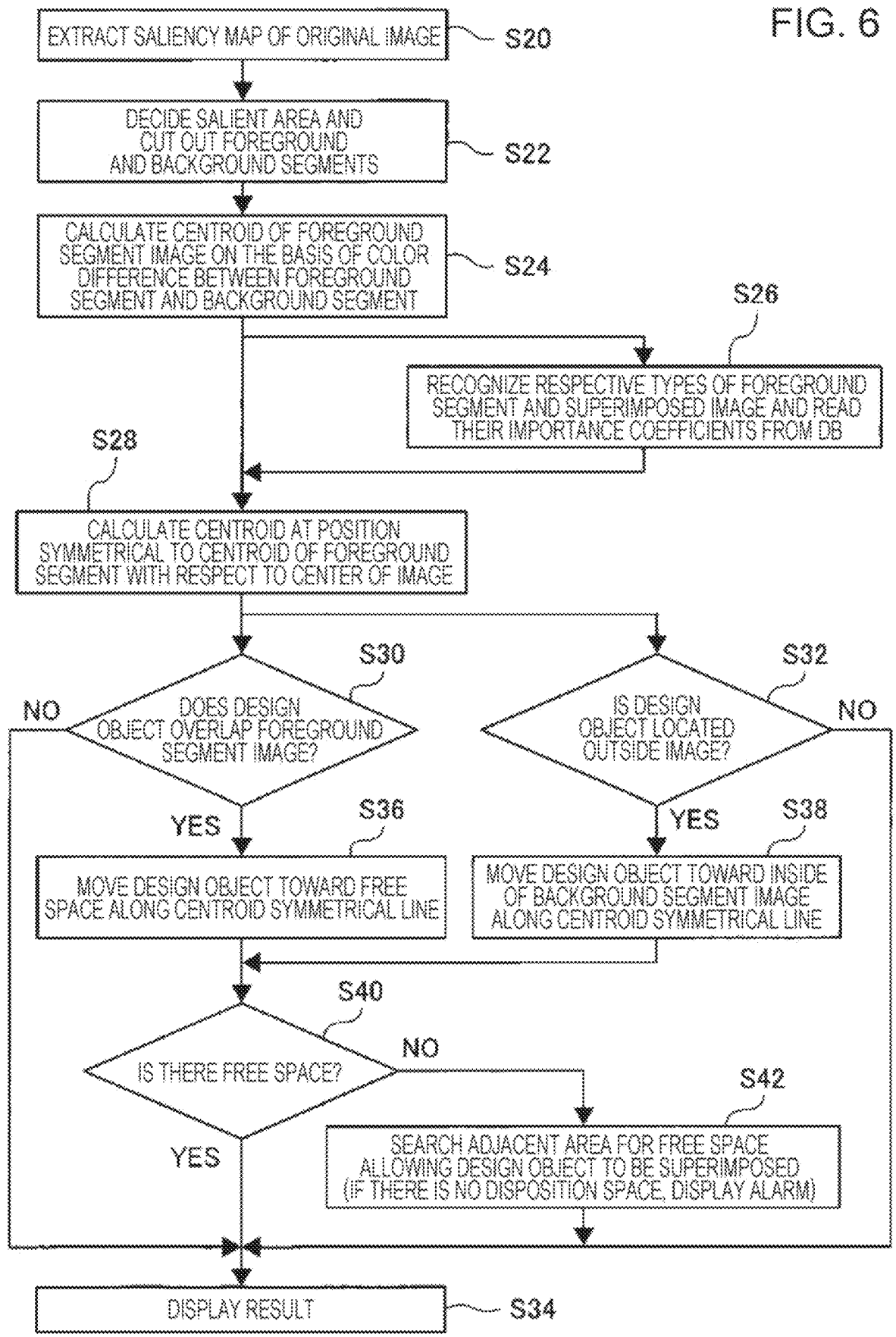
FIG. 6 is a flowchart illustrating the flow of operations of the image processing apparatus according to the exemplary embodiment of the present disclosure.

FIG. 6 illustrates a flowchart of operations of the processor 12.

Figure 7:
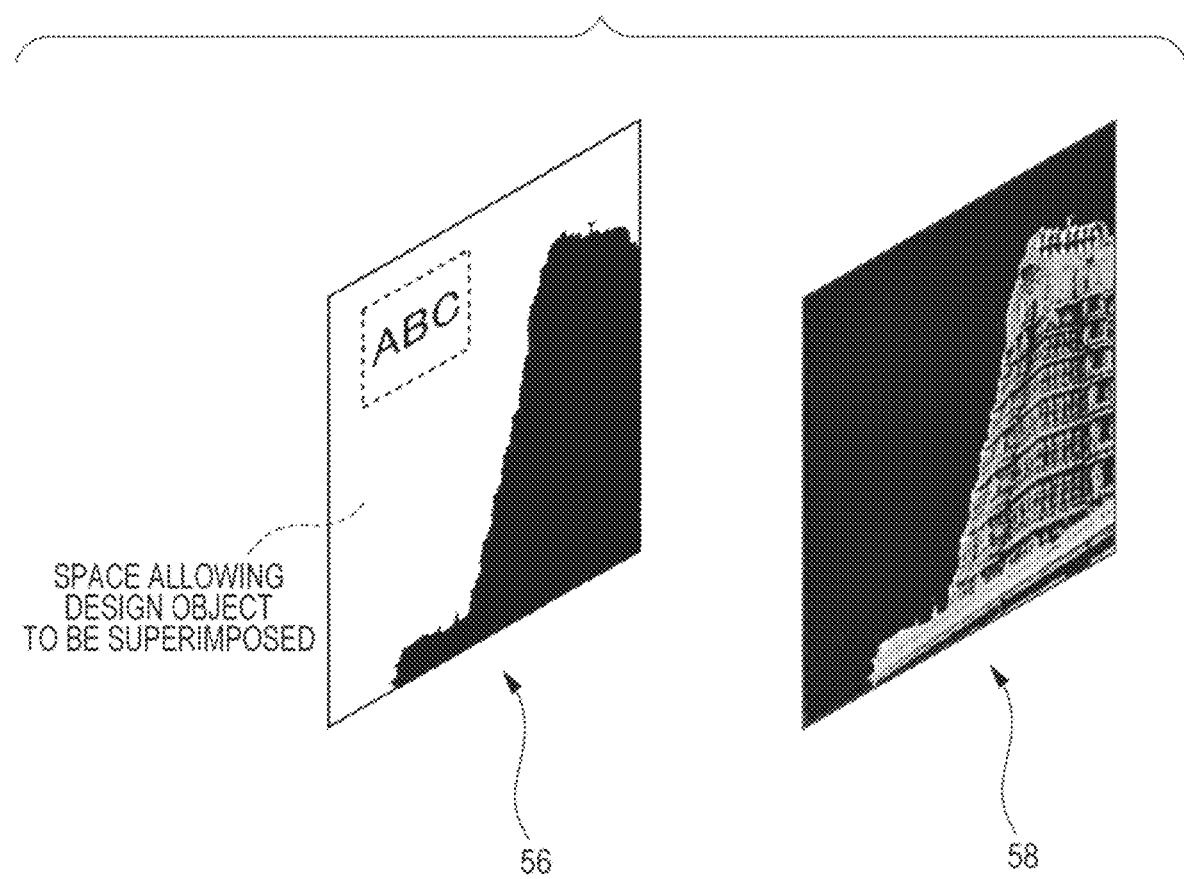
FIG. 7 is an explanatory view for explaining a method for cutting out a foreground segment image and a background segment image in the image processing apparatus according to the exemplary embodiment of the present disclosure.

First, in step S20, a saliency map of the design object image is extracted. In subsequent step S22, the salient area is decided, and a foreground segment and a background segment are cut out. The foreground segment and the background segment thus cut out are temporarily stored with layers separated as a foreground segment image layer 56 and a background segment image layer 58 as illustrated in FIG. 7.

In subsequent step S24, the centroid position of the foreground segment image is calculated on the basis of a color difference between the foreground segment and the background segment by using Formulas (1) and (2) described above. In subsequent step S26, the respective types of a design object and the foreground segment are recognized, and importance coefficients are read out from the importance database 54.

In subsequent step S28, the centroid position of the design object is calculated to place the centroid position at a position symmetrical to the centroid position of the foreground segment with respect to the center of the image.

Figure 8:
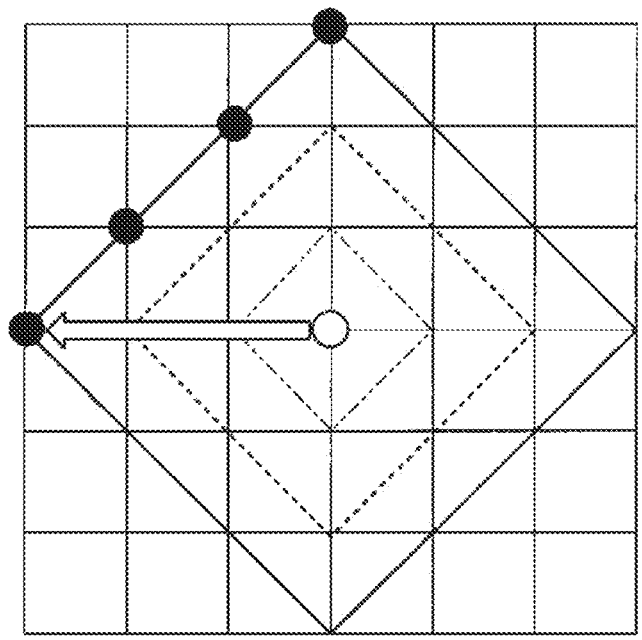
FIG. 8 is an explanatory view for explaining a method for finding a layout space in an adjacent area in the image processing apparatus according to the exemplary embodiment of the present disclosure.

In subsequent steps S30 and S32, whether the design object overlaps the foreground segment image and whether the design object protrudes from the background segment image are respectively determined. If it is determined in step S30 that the design object does not overlap the foreground segment image, or if it is determined in step S32 that the design object does not protrude from the background segment image, the processing proceeds to step S34, an image having the design object superimposed therein is displayed, and then the processing is terminated. That is, as illustrated in FIG. 8, if the background segment has a free space available to superimpose the design object and may thus superimpose the design object within the background segment, the image having the design object is displayed, and then the processing is terminated.

In contrast, if it is determined in step S30 that the design object overlaps the foreground segment image, the processing proceeds to step S36. In step S36, the design object is moved toward a free space along a centroid symmetrical line (a line connecting the centroid of the foreground segment image and the centroid of the design object across the center of the image). If it is determined in step S32 that the design object protrudes from the background segment, the processing proceeds to step S38. In step S38, the design object is moved toward the inside of the background segment along the centroid symmetrical line.

In subsequent step S40, it is determined whether there is a free space to superimpose the design object. If it is determined in step S40 that there is a free space to superimpose the design object, the processing proceeds to step S34, an image having the design object is displayed, and then the processing is terminated.

If it is determined that there is not a free space in step S40, the processing proceeds to step S42, a search for a free space in the second stage is performed. Specifically, as illustrated in FIG. 8, the centroid position of the design object is gradually moved to a peripheral area, and then whether the design object is superimposed within the background segment image is determined. In this exemplary embodiment, a search for the free space for the design object is performed in such a manner that the centroid position of the design object calculated first is set as X=0 and Y=0 and the centroid position of the design object is moved to a peripheral area, for example, in the order of X=−1 and Y=0, X=0 and Y=1, X=1 and Y=0, X=−1 and Y=−1, and X=2 and Y=0. If there is a free space in step S42, the processing proceeds to step S34, an image having the design object is displayed, and then the processing is terminated. If a free space is not found even though step S42 is performed, an alarm is displayed, and then the processing is terminated.

Examples according to the present disclosure will be described.

Figure 9:
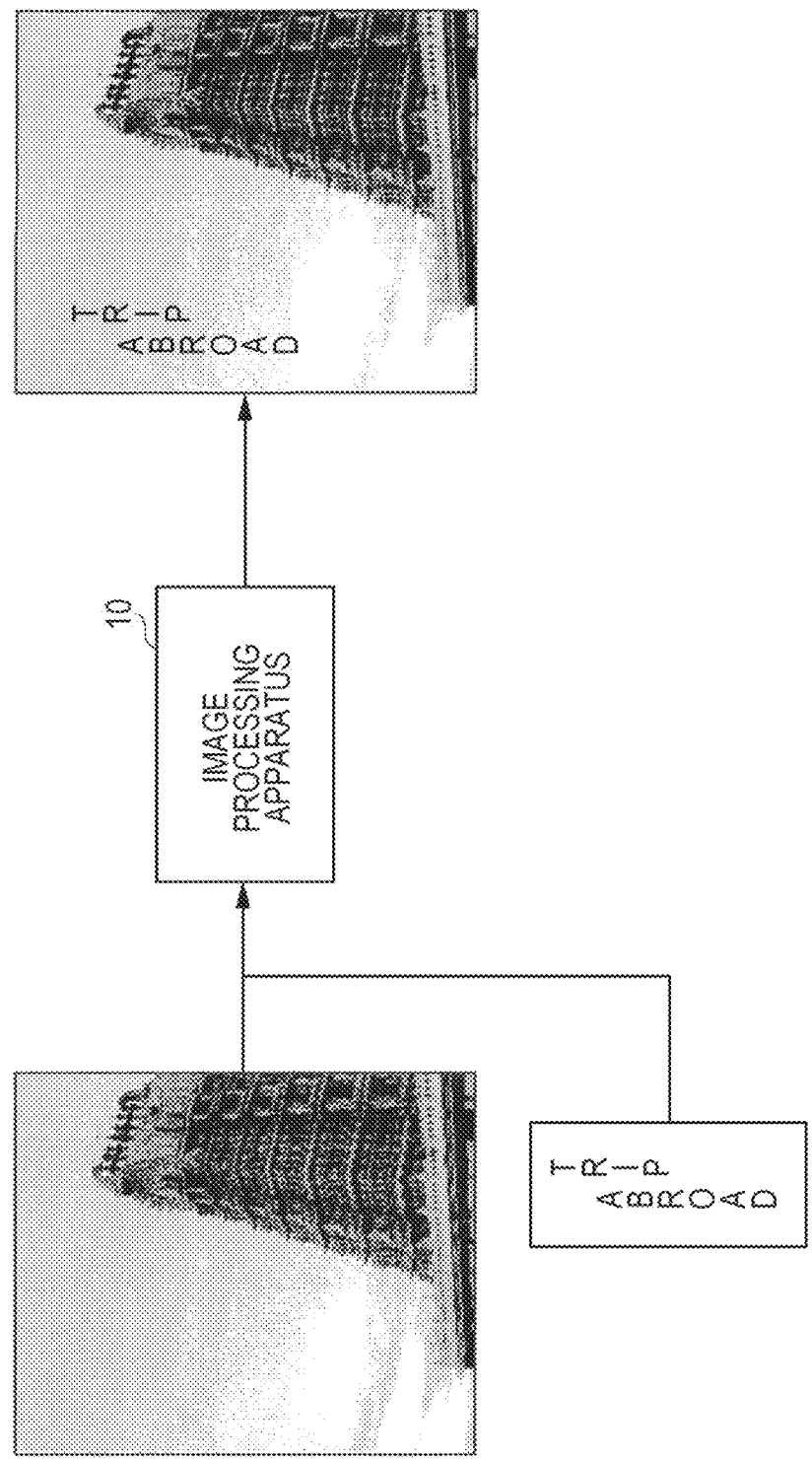
FIG. 9 is an explanatory view for explaining processing in Example 1 of the present disclosure.
Figure 10:
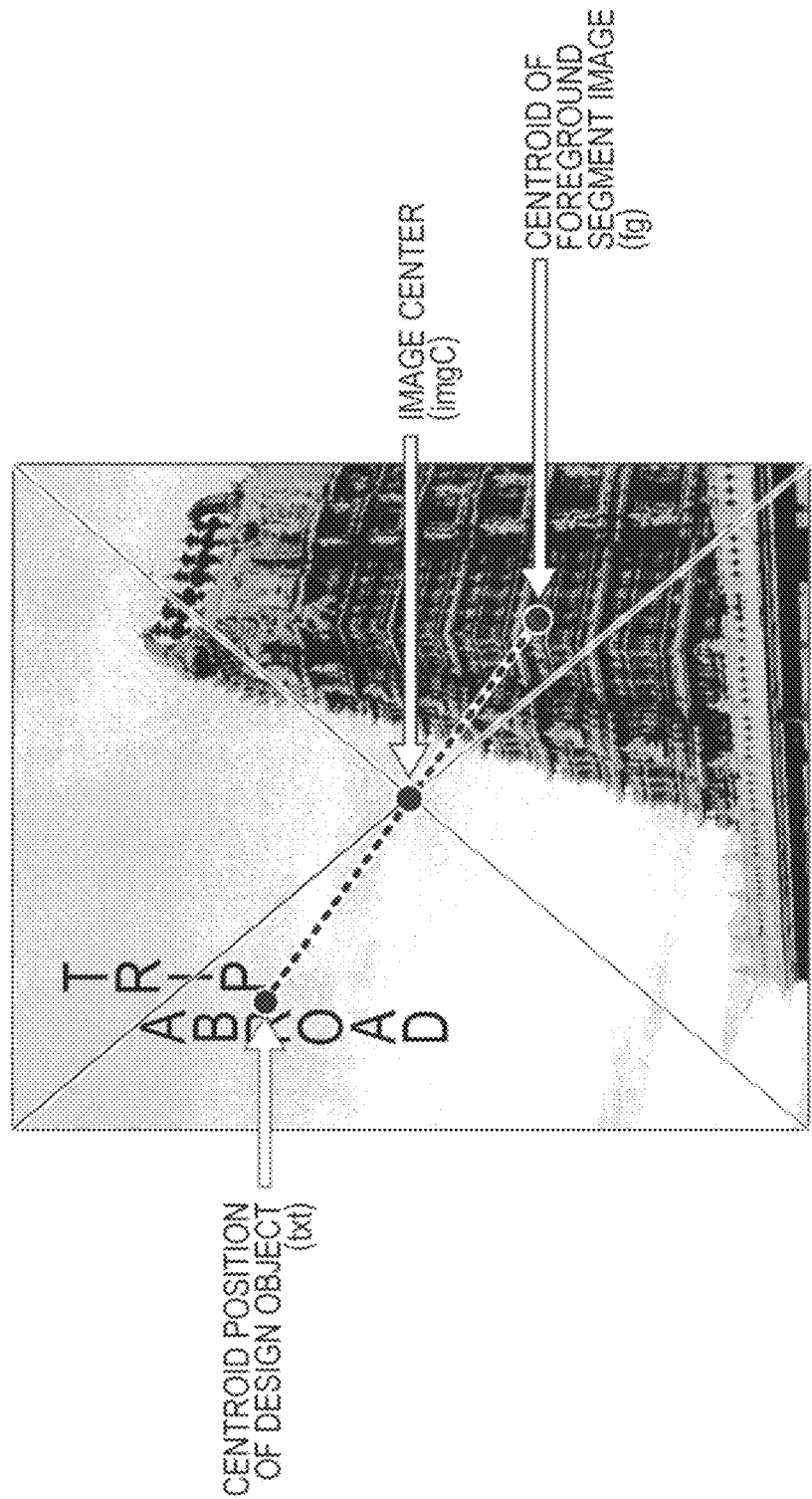
FIG. 10 is an explanatory view for explaining a method for obtaining the centroid position of a design object in Example 1 of the present disclosure.

FIGS. 9 and 10 illustrate Example 1.

In Example 1, as illustrated in FIG. 9, a design object composed of the text "TRIP ABROAD" is superimposed on the background segment image of the original image having 302 pixels times 360 pixels. The text is input after the size of the text box is set. The text box has a frame for inputting a text and extends vertically.

The foreground segment image is regarded as a building, and the main color ($R_{bg}$, $G_{bg}$, $B_{bg}$) of the background segment image is obtained as follows.

The main color ($R_{bg}$, $G_{bg}$, $B_{bg}$) of the background segment image=(181, 195, 206)

The centroid of the foreground segment image is obtained by using a color difference w(x,y) between the RGB data of pixels (x, y) of the foreground segment image and the RGB data regarding the main color of the background segment image in accordance with Formulas (1), (2), and (3) described above.

As the result of this, the centroid position of the foreground segment image ($x_{fg}$, $y_{fg}$) is obtained as follows.

The centroid position of the foreground segment image ($x_{fg}$, $y_{fg}$)=(228, 237)

The center ($x_{imgC}$, $y_{imgC}$) of the original image=(151, 180) is also obtained.

The importance of the building and the text is as follows.

The importance of the building $\alpha_{fg}$=0.05

The importance of the text $\alpha_{txt}$=1.0

If the design object is input as an image, the design object is converted to a text, and then the importance thereof is set.

As illustrated in FIG. 10, the centroid position of the design object (txt) that is a text is calculated to place the centroid position at a position symmetrical to the centroid position of the foreground segment image (fg) with respect to the center of the image (imgC) and to balance the moment of the foreground segment image and the design object. The calculation is performed on the basis of Formulas (5) and (6).

$$x_{txt} = \frac{x_{imgC}(\alpha_{fg}w_{fg} + \alpha_{txt}w_{txt}) - x_{fg}\alpha_{fg}w_{fg}}{\alpha_{txt}w_{txt}} \quad (5)$$

$$y_{txt} = \frac{y_{imgC}(\alpha_{fg}w_{fg} + \alpha_{txt}w_{txt}) - y_{fg}\alpha_{fg}w_{fg}}{\alpha_{txt}w_{txt}} \quad (6)$$

As the result, as illustrated in FIG. 10, the centroid position of the design object ($x_{txt}$, $y_{txt}$) is obtained as follows.

The centroid position of the design object ($x_{txt}$, $y_{txt}$)=(59, 112)

Figure 11:
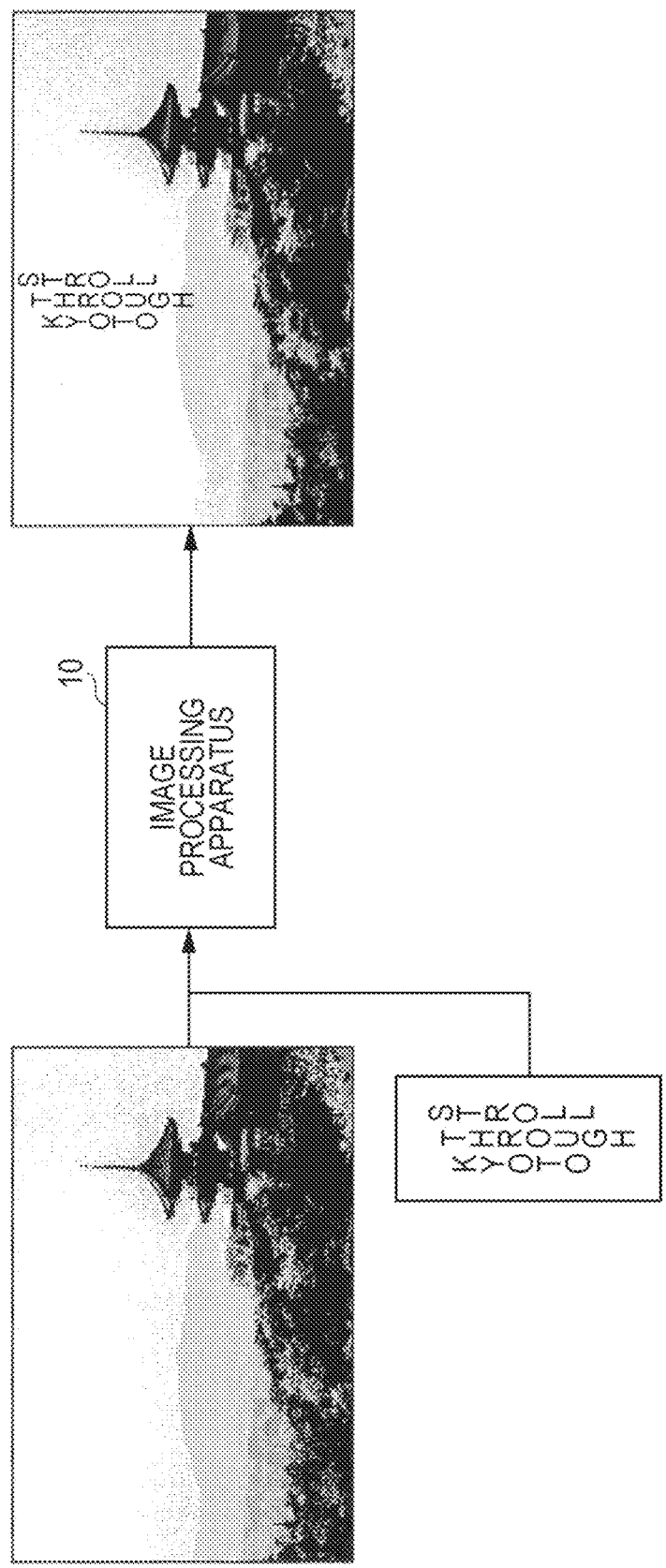
FIG. 11 is an explanatory view for explaining processing in Example 2 of the present disclosure.
Figure 12:
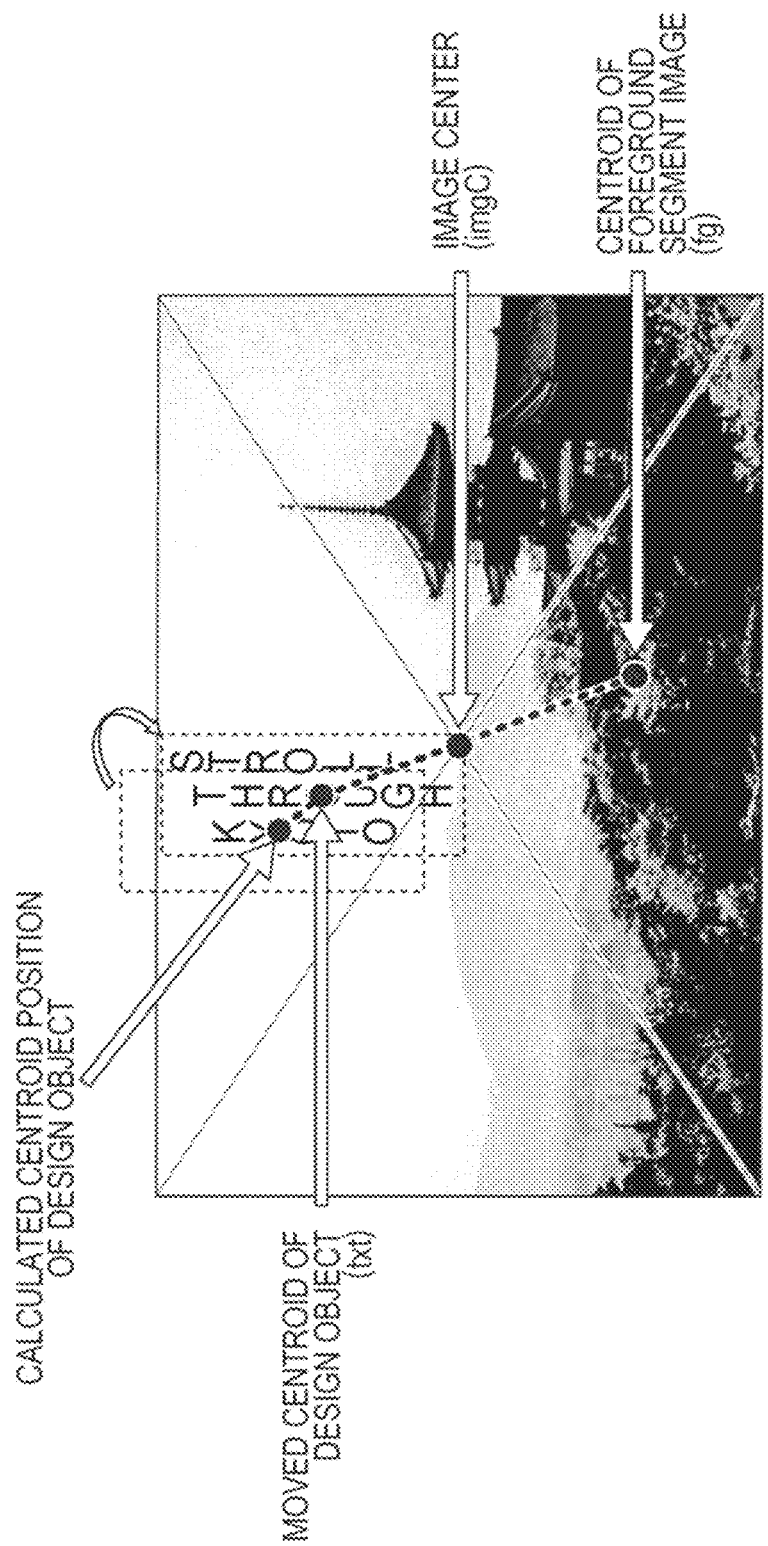
FIG. 12 is an explanatory view for explaining a method for obtaining the centroid position of a design object in Example 2 of the present disclosure.

FIGS. 11 and 12 illustrate Example 2.

In Example 2, as illustrated in FIG. 11, a design object composed of the text "STROLL THROUGH KYOTO" is superimposed on the background segment image of the original image having 360 pixels times 310 pixels. The text box extends vertically.

The foreground segment image is recognized as a building, and the main color ($R_{bg}$, $G_{bg}$, $B_{bg}$) of the background segment image is obtained as follows.

The main color of the background segment image ($R_{bg}$, $G_{bg}$, $B_{bg}$)=(167, 203, 204)

Calculating the centroid position of the foreground segment image in the same manner as in Example 1 results in the following.

The centroid position of the foreground segment image ($x_{fg}$, $y_{fg}$)=(215, 192)

The center of the original image ($x_{imgC}$, $y_{imgC}$)=(180, 155) is also obtained.

The importance of the building and the text is as follows.

The importance of the building $\alpha_{fg}$=0.05

The importance of the text $\alpha_{txt}$=1.0

Calculating the centroid position of the design object in the same manner as in Example 1 results in the following.

The centroid position of the design object ($x_{txt}$, $y_{txt}$)=(141, 41)

As the result, the design object protrudes from the original image as illustrated in FIG. 12.

Accordingly, the design object is moved along the centroid line as described above with reference to step S38, and the design object is thus superimposed within the background segment image at the following position.

The moved centroid position of the design object ($x_{txt}$, $y_{txt}$)=(145, 51)

Figure 13:
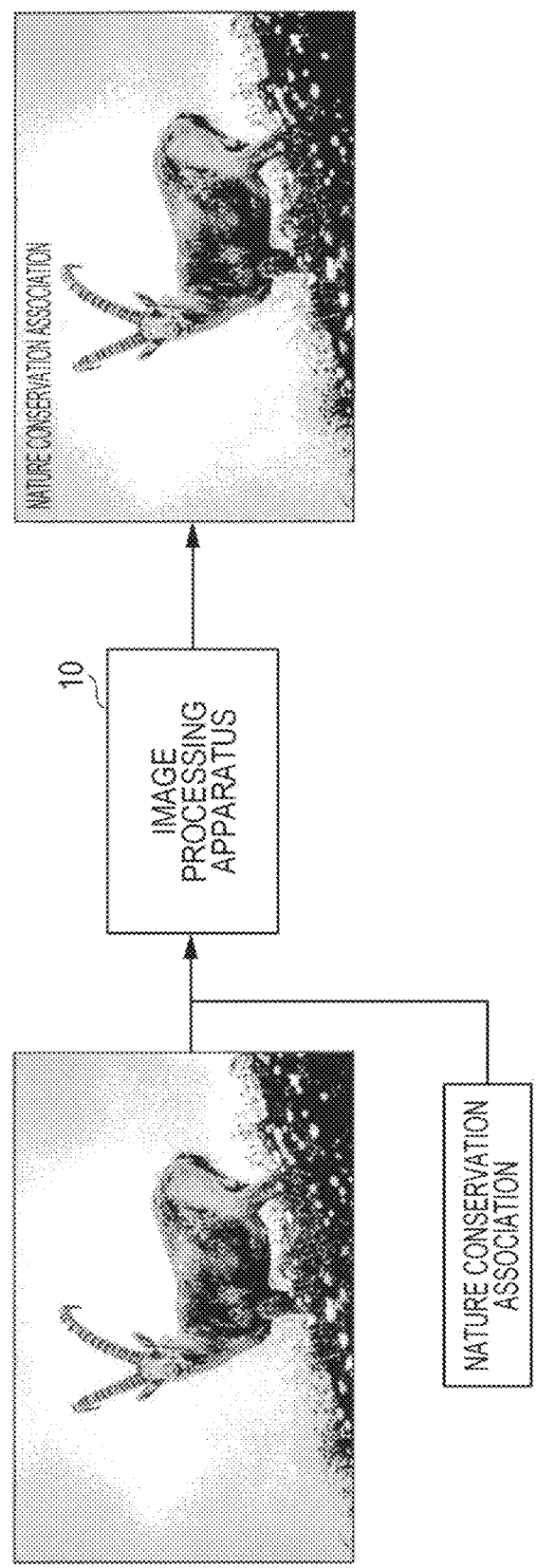
FIG. 13 is an explanatory view for explaining processing in Example 3 of the present disclosure.
Figure 14:
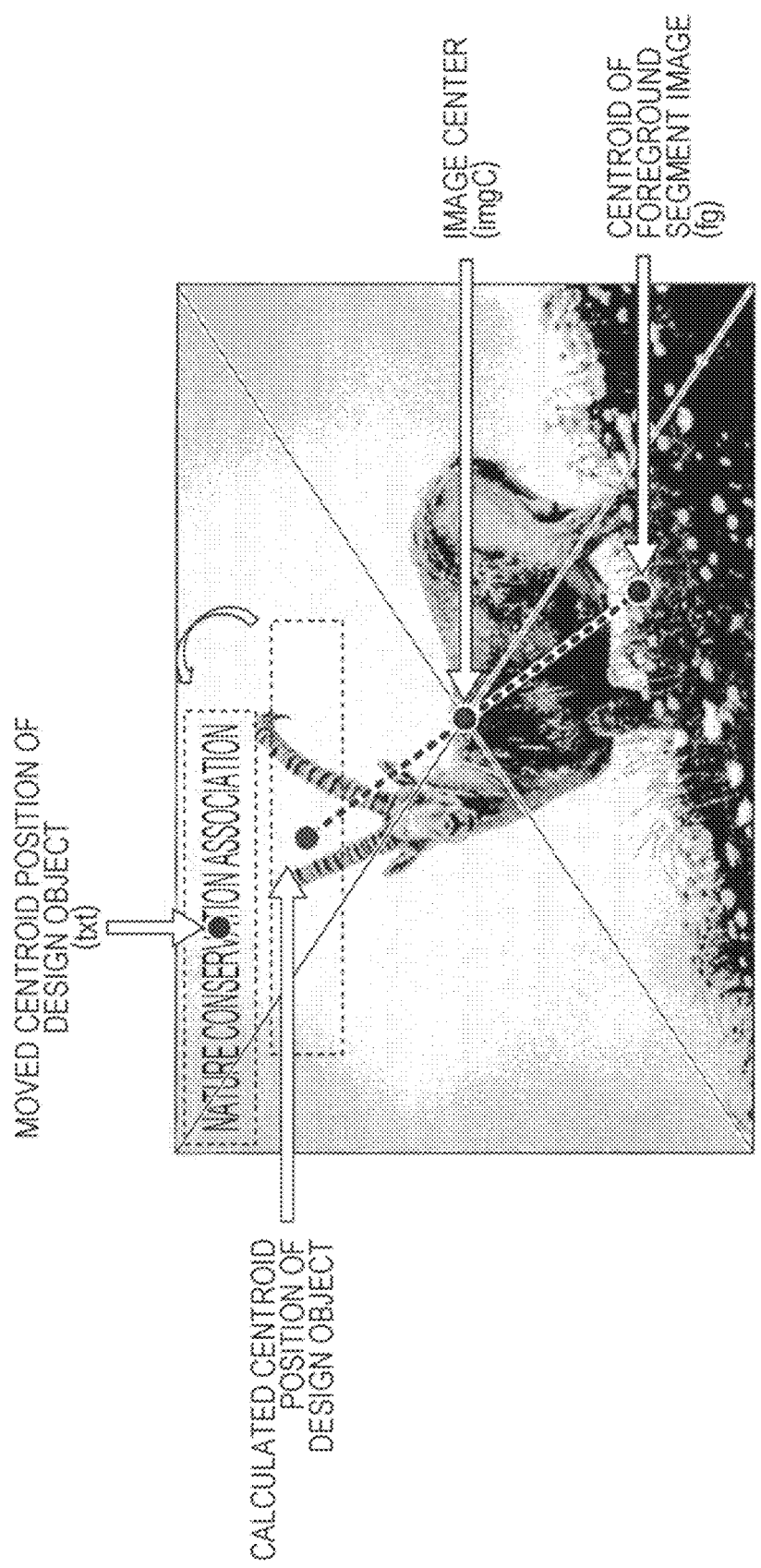
FIG. 14 is an explanatory view for explaining a method for obtaining the centroid position of a design object in Example 3 of the present disclosure.

FIGS. 13 and 14 illustrate Example 3.

In Example 3, as illustrated in FIG. 13, a design object composed of the text "NATURE CONSERVATION ASSOCIATION" is superimposed on the background segment image of the original image having 360 pixels times 239 pixels. The text box extends horizontally.

The foreground segment image is recognized as an animal, and the main color ($R_{bg}$, $G_{bg}$, $B_{bg}$) of the background segment image is obtained as follows.

The main color ($R_{bg}$, $G_{bg}$, $B_{bg}$) of the background segment image=(184, 199, 216)

Calculating the centroid position of the foreground segment image in the same manner as in Example 1 results in the following.

The centroid position of the foreground segment image ($x_{fg}$, $y_{fg}$)=(221, 180)

The center ($x_{imgC}$, $y_{imgC}$) of the original image=(180, 119) is also obtained.

The importance of the building and the text is as follows.

The importance of the animal $\alpha_{fg}$=0.1

The importance of the text $\alpha_{txt}$=1.0

Calculating the centroid position of the design object in the same manner as in Example 1 results in the following.

The centroid position of the design object ($x_{txt}$, $y_{txt}$)=(131, 47)

As the result, the design object overlaps the foreground segment image as illustrated in FIG. 14.

Accordingly, the design object is moved along the centroid line as described above with reference to step S36, and the design object does not overlap the foreground segment image at the following position.

The moved centroid position of the design object $(x_{txt}, y_{txt})$=(34, 21)

Figure 15:
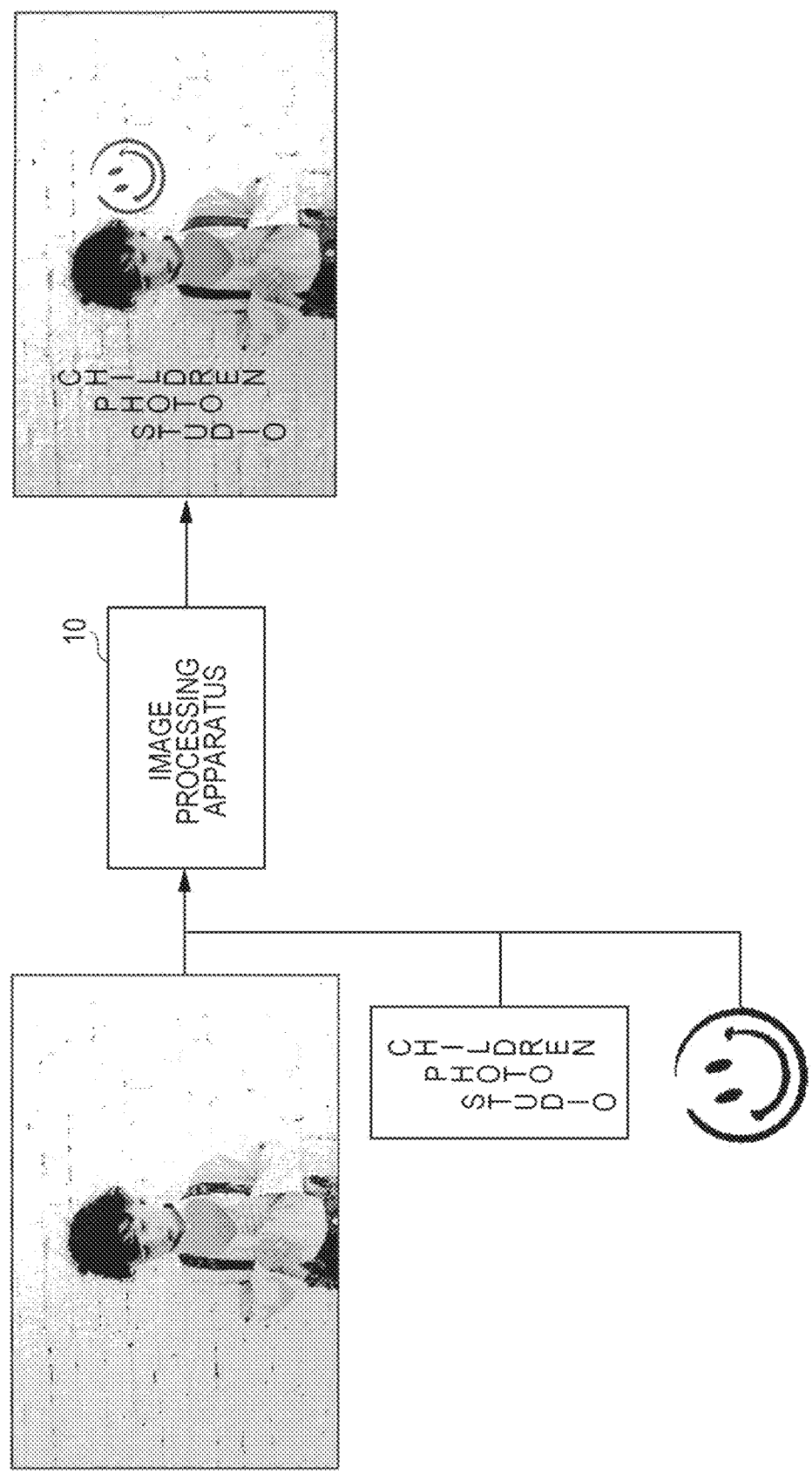
FIG. 15 is an explanatory view for explaining processing in Example 4 of the present disclosure.
Figure 16:
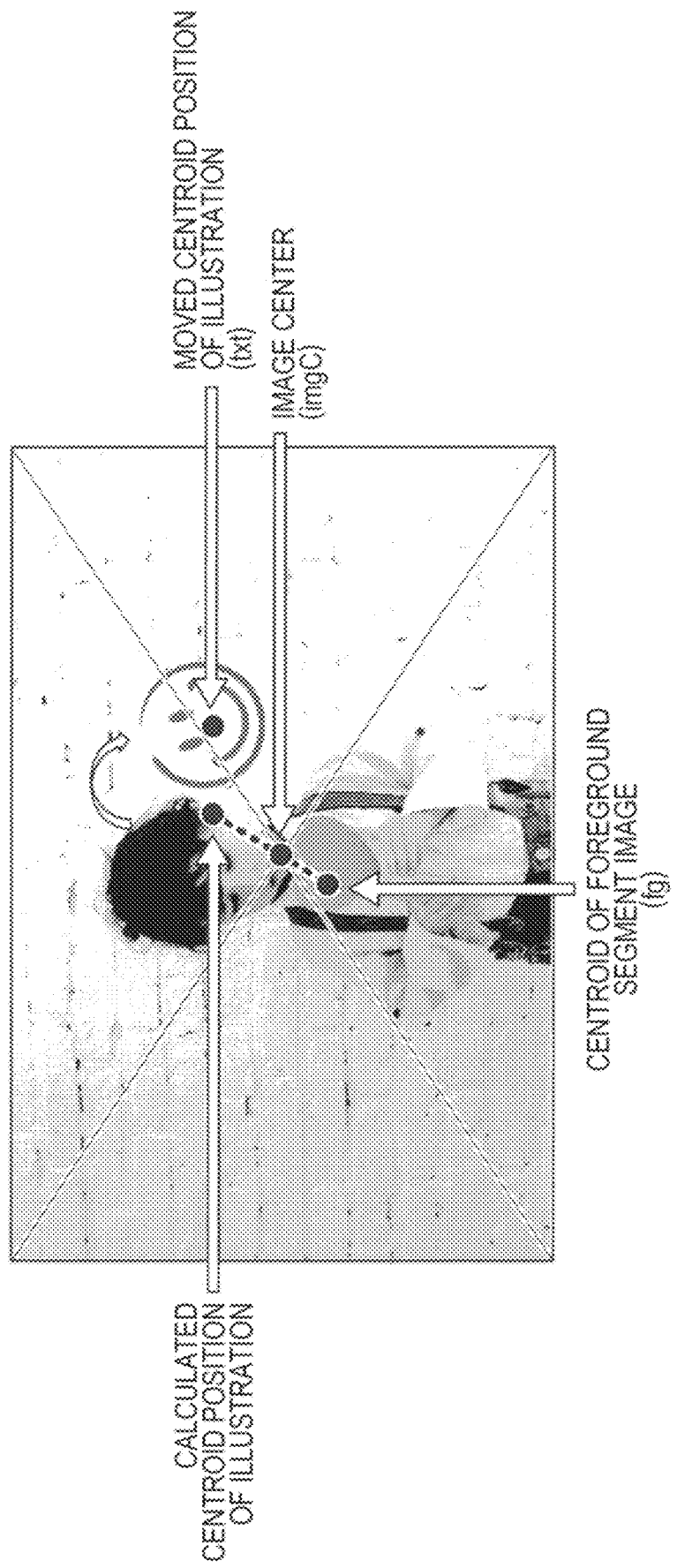
FIG. 16 is an explanatory view for explaining a method for obtaining the centroid position of an illustration in Example 4 of the present disclosure.
Figure 17:
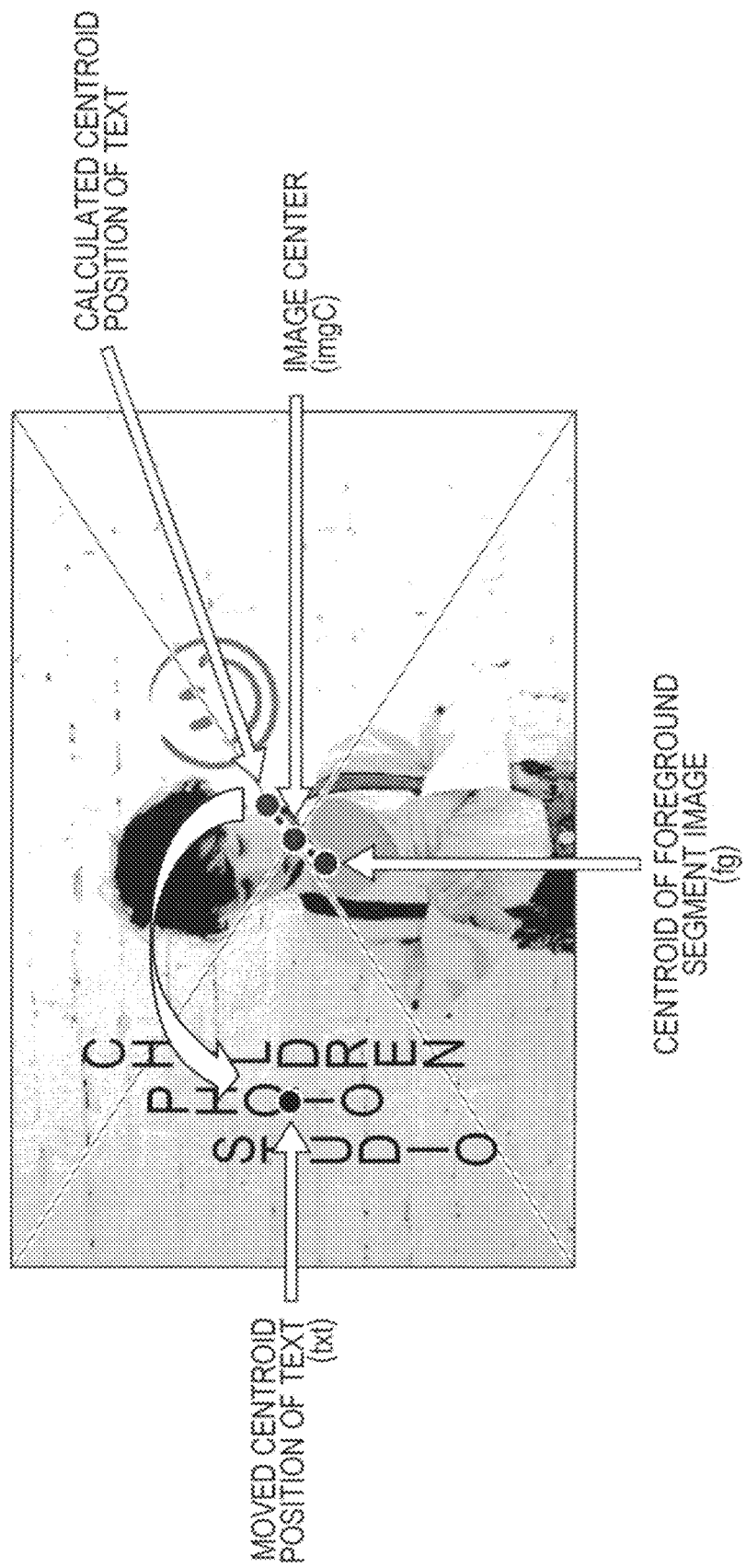
FIG. 17 is an explanatory view for explaining a method for obtaining the centroid position of a text in Example 4 of the present disclosure.

FIGS. 15, 16, and 17 illustrate Example 4.

In Example 4, as illustrated in FIG. 15, a design object composed of an illustration and the text "CHILDREN PHOTO STUDIO" is superimposed on the background segment image of the original image having 360 pixels times 240 pixels. The text box extends vertically.

The foreground segment image is regarded as a person, and the main color $(R_{bg}, G_{bg}, B_{bg})$ of the background segment image is obtained as follows.

The main color $(R_{bg}, G_{bg}, B_{bg})$ of the background segment image=(200, 198, 207)

Calculating the centroid position of the foreground segment image in the same manner as in Example 1 results in the following.

The centroid position of the foreground segment image $(x_{fg}, y_{fg})$=(166, 142)

The center $(x_{imgC}, y_{imgC})$ of the original image=(180, 120) is also obtained.

The importance coefficients of the person, the illustration, and text are extracted, and the illustration is first superimposed on the background segment image.

The illustration layout space overlaps the foreground segment image, and the centroid of the illustration is moved to a free space in an adjacent area as illustrated in FIG. 16. As the result, the centroid position of the illustration is obtained as follows.

The centroid position of the illustration $(x_{illus}, y_{illus})$=(238, 90)

Subsequently, the text is superimposed on the background segment image. At this time, the illustration is included in and handled as a design object image. Specifically, the centroid position of the foreground segment image is calculated with the illustration being included in the foreground segment image.

As the result of re-calculation, a new foreground segment centroid position is obtained as follows.

The new foreground segment centroid position $(x_{fg}, y_{fg})$=(185, 110)

After the centroid position to superimpose the text is calculated on the basis of the new foreground segment centroid position, the text layout space overlaps the foreground segment image as illustrated in FIG. 17, and the centroid position of the text is moved to a free space in an adjacent area. This results in the following, and the text is superimposed on the background segment image.

The centroid position of the text $(x_{txt}, y_{txt})$=(74, 110)

Figure 18A:
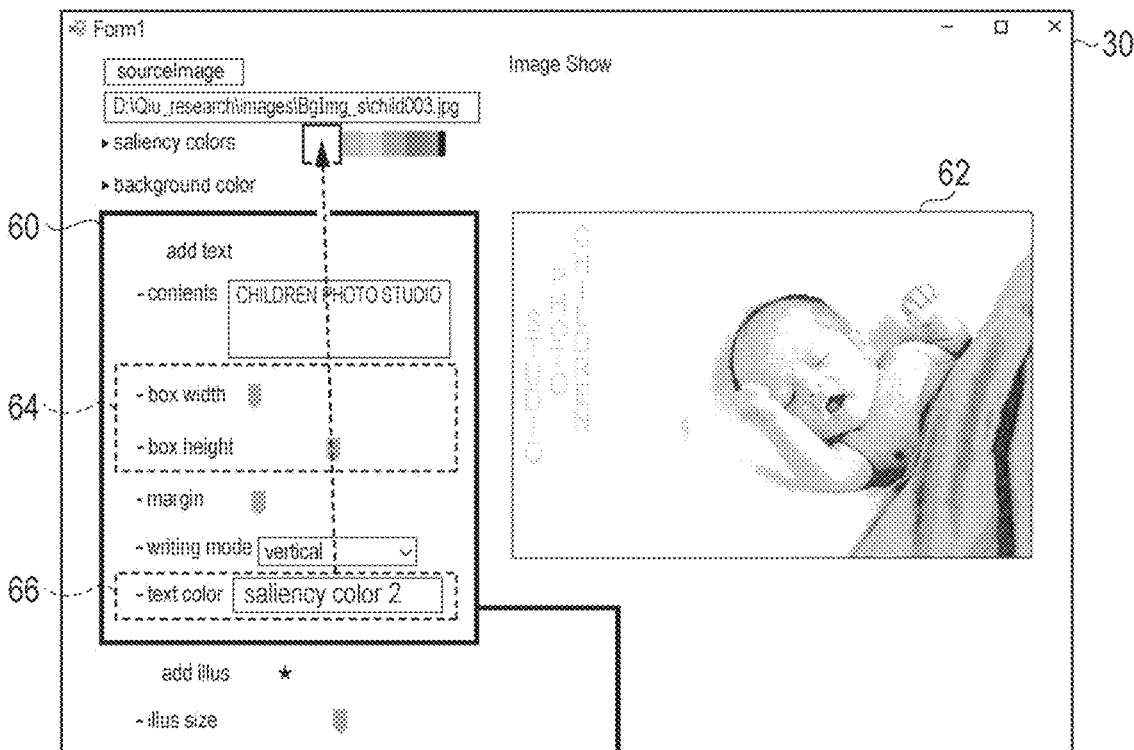
FIGS. 18A and 18B are explanatory views for explaining the change of a screen with the size and color of a text changed in Example 5 of the present and respectively illustrate screens before the change and after the change.
Figure 18B:
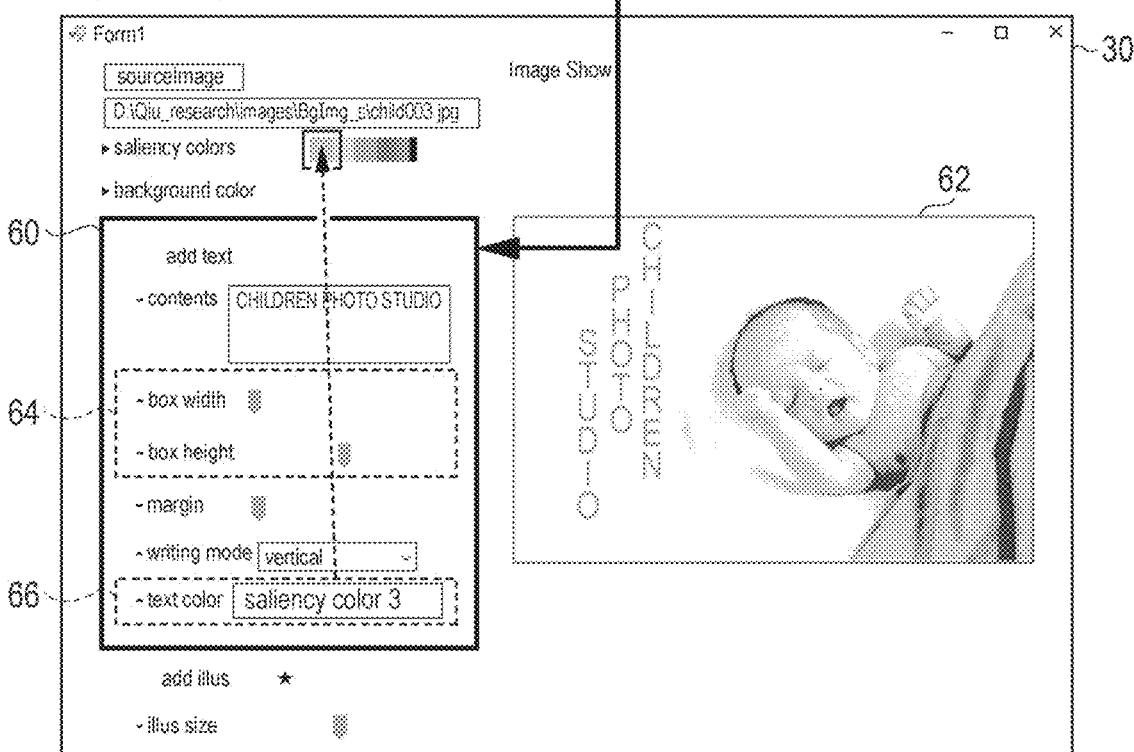

FIGS. 18A and 18B illustrate Example 5.

Example 5 is an example where a text is to be superimposed and where not only the size (width and height) but also the color of the text is changed.

Specifically, FIGS. 18A and 18B respectively illustrate screens displayed on the display 30 described above. On each screen, an operation/instruction section 60 and a result display 62 are respectively laid out in the left part and the right part of the screen. The operation/instruction section 60 includes a text size designation section 64 and a text color designation section 66. The text size designation section 64 is used to designate the size of a text. The text color designation section 66 is used to designate the color of the text. The text color designation section 66 is designed to enable a color used in an image on the result display 62 to be designated. The use of a color used in the image as the color of the text reduces a sense of incongruity as compared with a case where black is designated as the text color. However, white or black may be designated as the text color.

When the size of the text is increased by using the text size designation section 64, and when the text color is made darker by using the text color designation section 66, the state in FIG. 18A of the display on the result display 62 is changed to the state in FIG. 18B.

In this case, the size of the text is increased, and a color difference between the text and the background segment image is thus increased. Accordingly, the weight of the text is increased, and thus the text moves to the center of the screen.

In the embodiment above, the term "processor" refers to hardware in a broad sense. Examples of the processor include general processors (e.g., CPU: Central Processing Unit), dedicated processors (e.g., GPU: Graphics Processing Unit, ASIC: Application Specific Integrated Circuit, FPGA: Field Programmable Gate Array, and programmable logic device).

In the embodiment above, the term "processor" is broad enough to encompass one processor or plural processors in collaboration which are located physically apart from each other but may work cooperatively. The order of operations of the processor is not limited to one described in the embodiment above, and may be changed.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An image processing apparatus comprising:
a processor configured to:
 receive an image having a foreground segment and a background segment;
 receive a design object;
 obtain a centroid position of the foreground segment, and obtain a centroid position of the design object on a basis of the centroid position of the foreground segment;
 calculate a position for superimposing the design object, on a basis of respective features of the foreground segment, the background segment, and the design object; and
 perform output to superimpose the design object at the calculated position.

2. The image processing apparatus according to claim 1, wherein the processor obtains the centroid position of the design object to place the centroid position of the design object at a position symmetrical to the centroid position of the foreground segment with respect to a center of the image.

3. The image processing apparatus according to claim 2, wherein the processor obtains the centroid position of the foreground segment with inclusion of a color difference of color of the foreground segment from color of the background segment.

4. The image processing apparatus according to claim 3, wherein the processor obtains the centroid position of the design object with inclusion of a color difference of color of the design object from color of the background segment.

5. The image processing apparatus according to claim 2, wherein the processor obtains the centroid position of the design object with inclusion of a color difference of color of the design object from color of the background segment.

6. The image processing apparatus according to claim 1, wherein the processor obtains the centroid position of the foreground segment with inclusion of a color difference of color of the foreground segment from color of the background segment.

7. The image processing apparatus according to claim 6, wherein the processor obtains the centroid position of the design object with inclusion of a color difference of color of the design object from color of the background segment.

8. The image processing apparatus according to claim 1, wherein the processor obtains the centroid position of the foreground segment with inclusion of a color difference of color of the foreground segment from color of the background segment.

9. The image processing apparatus according to claim 8, wherein the processor obtains the centroid position of the design object with inclusion of a color difference of color of the design object from color of the background segment.

10. The image processing apparatus according to claim 1, wherein the processor obtains the centroid position of the design object with inclusion of a color difference of color of the design object from color of the background segment.

11. The image processing apparatus according to claim 1, wherein the processor calculates the position for superimposing the design object with inclusion of data regarding a type of the foreground segment.

12. The image processing apparatus according to claim 1, wherein the processor calculates the position for superimposing the design object with inclusion of data regarding a type of the design object.

13. The image processing apparatus according to claim 1, wherein when the design object protrudes from the image, the processor moves the design object to superimpose the design object within the image.

14. The image processing apparatus according to claim 1, wherein if the design object overlaps the foreground segment, the processor moves the design object to superimpose the design object within the background segment.

15. The image processing apparatus according to claim 1, wherein the processor receives a first design object and a second design object, calculates a position for superimposing the first design object, on a basis of respective features of the foreground segment, the background segment, and the first design object, and calculates a position for superimposing the second design object, by using the foreground segment having the first design object added to the foreground segment.

16. A non-transitory computer readable medium storing a program causing a computer to execute a process comprising:
 receiving an image having a foreground segment and a background segment;
 receiving a design object;
 obtaining a centroid position of the foreground segment, and obtaining a centroid position of the design object on a basis of the centroid position of the foreground segment;
 calculating a position for superimposing the design object, on a basis of respective features of the foreground segment, the background segment, and the design object; and
 performing output to superimpose the design object at the calculated position.

* * * * *